E. B. MANNING.
BOTTOMS FOR TEA AND COFFEE POTS.

No. 180,485. Patented Aug. 1, 1876.

Witnesses

Edw.d B. Manning
Inventor
By Atty

UNITED STATES PATENT OFFICE.

EDWARD B. MANNING, OF NEW HAVEN, CONNECTICUT.

IMPROVEMENT IN BOTTOMS FOR TEA AND COFFEE POTS.

Specification forming part of Letters Patent No. 180,485, dated August 1, 1876; application filed July 10, 1876.

*To all whom it may concern:*

Be it known that I, EDWARD B. MANNING, of New Haven, in the county of New Haven and State of Connecticut, have invented a new Improved Bottom for Tea and Coffee Pots; and I do hereby declare the following, when taken in connection with the accompanying drawings and the letters of reference marked thereon, to be a full, clear, and exact description of the same, and which said drawings constitute part of this specification, and represent in—

Figure 1:
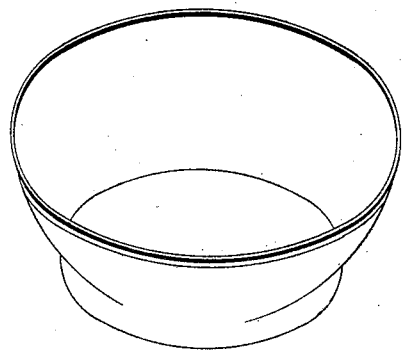
Figure 2:
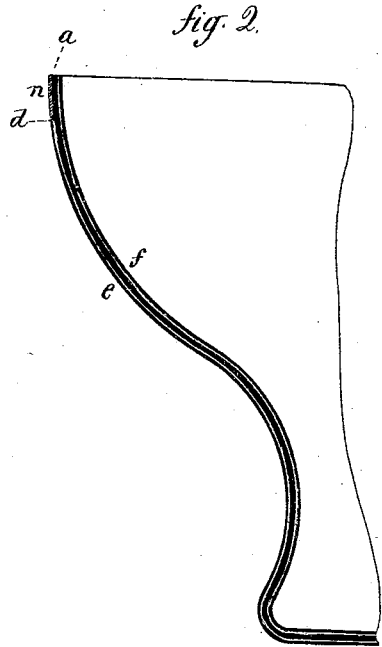
Figure 3:

Figure 1 a perspective view of the bottom; Fig. 2, a sectional view enlarged; and in Fig. 3, a pot as constructed with the improved bottom.

This invention relates to an improvement in the manufacture of hard-metal bottoms for tea and coffee pots.

Heretofore these have been made of hard metal, as iron, and tinned outside and in, and then attached to the upper or soft-metal part of the pot by soldering. This coated metal is soon discolored by heating, and if the pot, by accident, becomes dry, while on the heater, the tin melts and flows upon the surface, both being serious objections to this otherwise valuable article of manufacture.

The object of this invention is to overcome these difficulties; and it consists in a hard-metal bottom for tea and coffee pots, and similar vessels, coated with a vitreous material to near the upper edge on the external surface, the remaining portion tinned, or otherwise prepared for union with the top of the pot.

The form of the bottom of the pot is immaterial to this invention. It is made of sufficient height to prevent the heating of the upper or softer portion to the melting-point, usually about the proportion of height shown in Fig. 3.

This bottom is struck or otherwise formed from sheet iron, or other hard metal, indicated by the central heavy line $a$, in Fig. 2. After being properly shaped, this bottom is coated externally with porcelain, or vitreous material up to within a short distance of the upper edge—say to the point $d$. This coating is represented by the outer line $e$, and it also should be coated upon the inside throughout, as indicated by the inner line $f$. This done, the remaining portion of the surface at the upper edge, represented by the portion $n$, is coated with tin or other substance to facilitate the soldering of the top portion to the bottom.

This completes the article, and it is ready for the trade, or manufacturers, who take the bottoms, and apply the top of any desired form or style, uniting the two parts by soldering or equivalent means.

I claim—

As an article of manufacture, the herein-described bottom for tea and coffee pots, and similar vessels, consisting of the hard-metal base, externally coated with a vitreous material to near the upper edge, the remaining surface prepared for soldering, substantially as set forth.

EDWARD B. MANNING.

Witnesses:
 JOHN E. EARLE,
 CLARA BROUGHTON.